(12) United States Patent
Wilson

(10) Patent No.: US 7,207,604 B2
(45) Date of Patent: Apr. 24, 2007

(54) SNAP-FIT CONNECTION FOR POOL FILTRATION SYSTEMS

(75) Inventor: Thomas M. Wilson, Sanford, NC (US)

(73) Assignee: Pentair Pool Products, Inc., Moorpark, CA (US)

( * ) Notice: Subject to any disclaimer, the term of this patent is extended or adjusted under 35 U.S.C. 154(b) by 0 days.

(21) Appl. No.: 10/915,966

(22) Filed: Aug. 11, 2004

(65) Prior Publication Data
US 2006/0033332 A1 Feb. 16, 2006

(51) Int. Cl.
F16L 39/00 (2006.01)

(52) U.S. Cl. .................. 285/319; 285/305; 285/921

(58) Field of Classification Search ............... 285/331, 285/307, 319, 328, 921, 305, 361, 402, 396, 285/359, 362, 395
See application file for complete search history.

(56) References Cited

U.S. PATENT DOCUMENTS

| 737,357 | A | * | 8/1903 | Crump et al. ............... 285/319 |
| 3,709,526 | A | * | 1/1973 | Cromie ....................... 285/359 |
| 3,937,547 | A | * | 2/1976 | Lee-Kemp ................... 285/319 |
| 4,209,080 | A | * | 6/1980 | Douglas ..................... 285/319 |
| 4,328,101 | A | | 5/1982 | Broden |
| 4,758,023 | A | * | 7/1988 | Vermillion .................. 285/921 |
| 5,031,266 | A | * | 7/1991 | Tillman et al. ............. 285/319 |
| 5,269,913 | A | | 12/1993 | Atkins |
| 5,554,277 | A | | 9/1996 | Rief et al. |
| 5,863,425 | A | | 1/1999 | Herlehy et al. |
| 5,947,462 | A | | 9/1999 | Roussel |
| 6,287,462 | B1 | | 9/2001 | Likos |
| 2003/0196941 | A1 | | 10/2003 | Danner |
| 2003/0205513 | A1 | | 11/2003 | Stoltz et al. |

* cited by examiner

Primary Examiner—Aaron Dunwoody
(74) Attorney, Agent, or Firm—Michael Best & Friedrich LLP

(57) ABSTRACT

A snap-fit connection assembly for use in a pool filtration system. The connection assembly includes a first connection receptacle, a second connection receptacle for insertion into the first connection receptacle, one or mores fingers extending circumferentially from the second connection receptacle, and one or more openings in the first connection receptacle for engaging the finger(s).

20 Claims, 4 Drawing Sheets

SNAP-FIT CONNECTION FOR POOL FILTRATION SYSTEMS

BACKGROUND OF THE INVENTION

The present invention relates to pool filtration system, and more particularly to a snap-fit connection for connecting a filter pot to a pump in a pool filtration system.

Swimming pool filtration systems commonly include strainer pots that must be securely connected to a pump housing. The connection must be watertight, but should be removable since servicing the filtration system often requires the strainer pot to be disconnect from the pump.

Several designs exist in the prior art for connecting a strainer pot to a pump. One design involves the provision of a threaded connection between the pot and the pump. However, due to the threaded connection, this design lacks sufficient rotational stability. The pot can be made to turn over onto its side with very little external force.

Another design includes a union nut that is threaded onto the pump face. The union nut is retained by a ring or clip. However, if the clip is overloaded, the connection will fail. Further, the addition of two parts, the union ring and the clip, adds to the cost of assembly.

A further design uses through-bolts with nuts to connect the two parts. This design provides a secure connection, but involves additional material and labor expenses, is tedious to assembly and requires additional tools for assembly. Such complex assembly should be avoided, since the strainer pot and pump are normally assembled in the field.

BRIEF SUMMARY OF THE INVENTION

The present invention provides a snap-fit connection assembly for use in a pool filtration system. The connection comprises: a first connection receptacle, a second connection receptacle for insertion into the first connection receptacle, a finger extending circumferentially from the second connection receptacle, and an opening in the first connection receptacle for engaging the finger.

DETAILED DESCRIPTION OF THE INVENTION

Figure 1:
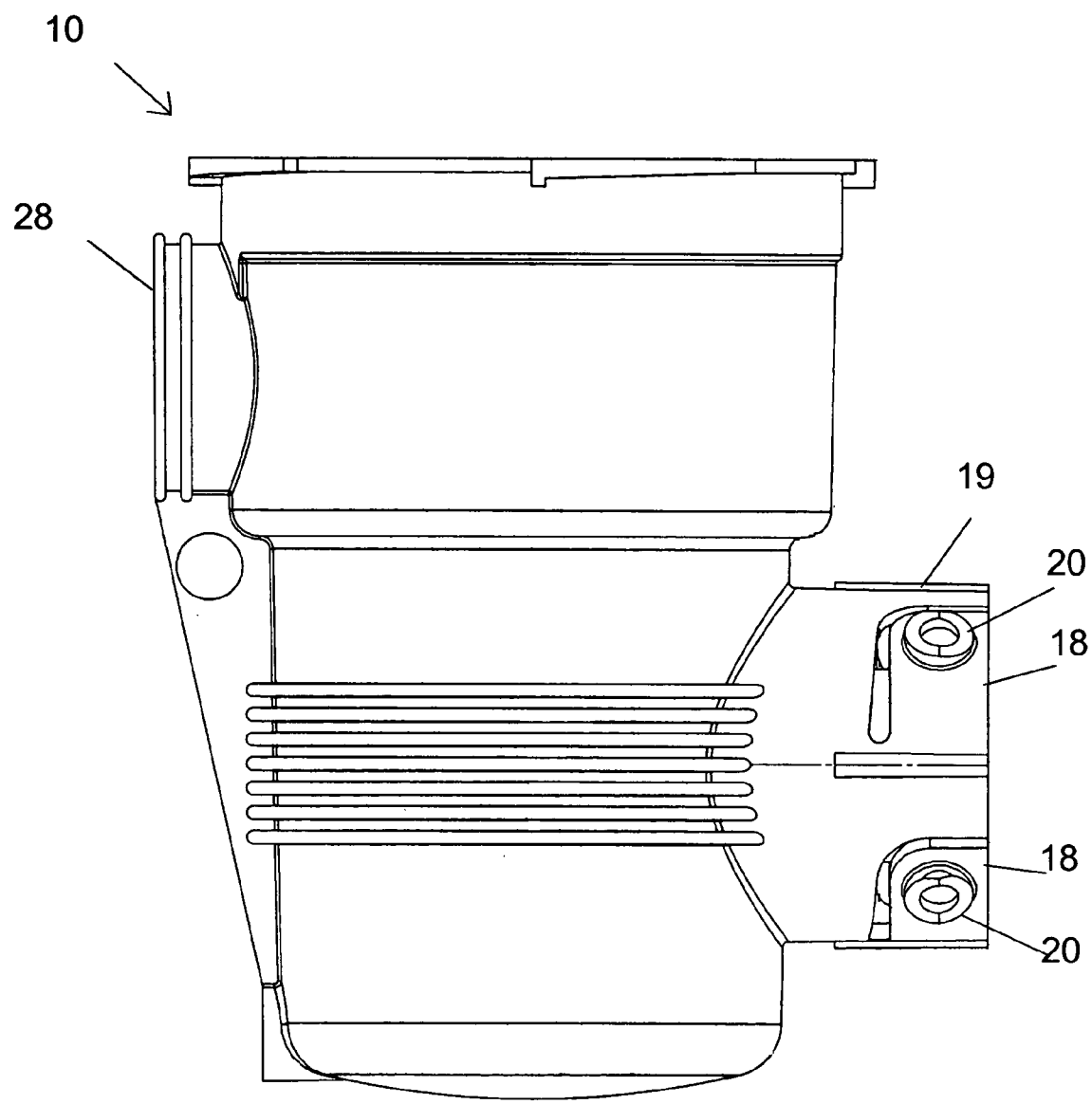
FIG. 1 is a front elevation of a strainer pot having a connection tube with fingers according to an example embodiment of the present invention.

FIGS. 1–5 illustrate an example embodiment of a strainer pot 10 and pump 12 for a swimming pool filtration systems according to the present invention. The pot 10 includes a cylindrical outlet tube or duct 14 that fits into a cylindrical inlet tube or duct 16 of the pump 12. As described hereinafter, a snap-fit style connection is provided for retaining a connection of the outlet tube of the strainer pot 10 to the inlet tube 16 of the pump 12.

Figure 2:
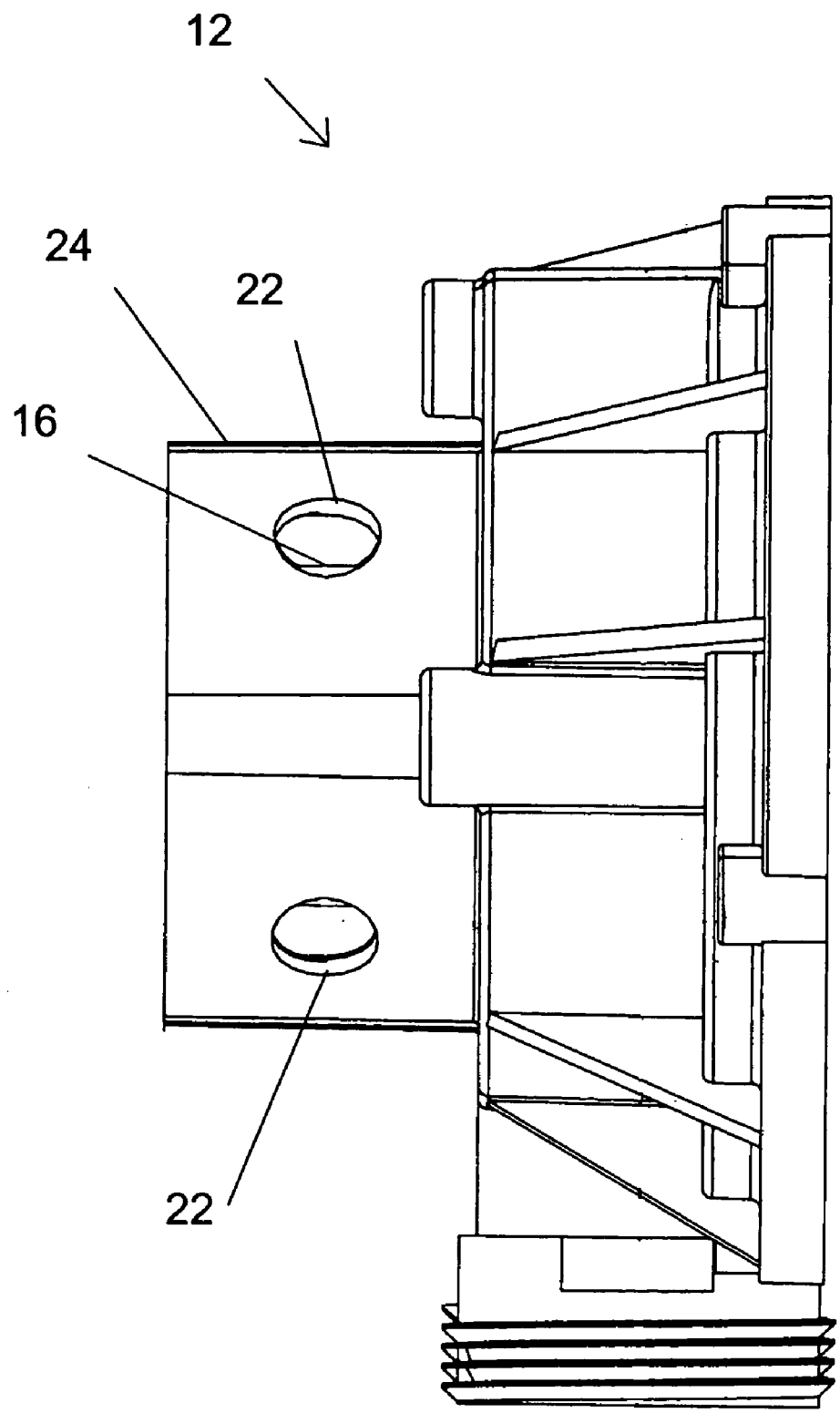
FIG. 2 is a front elevation of a pump body having a connection tube with openings according to an example embodiment of the present invention.
Figure 3:
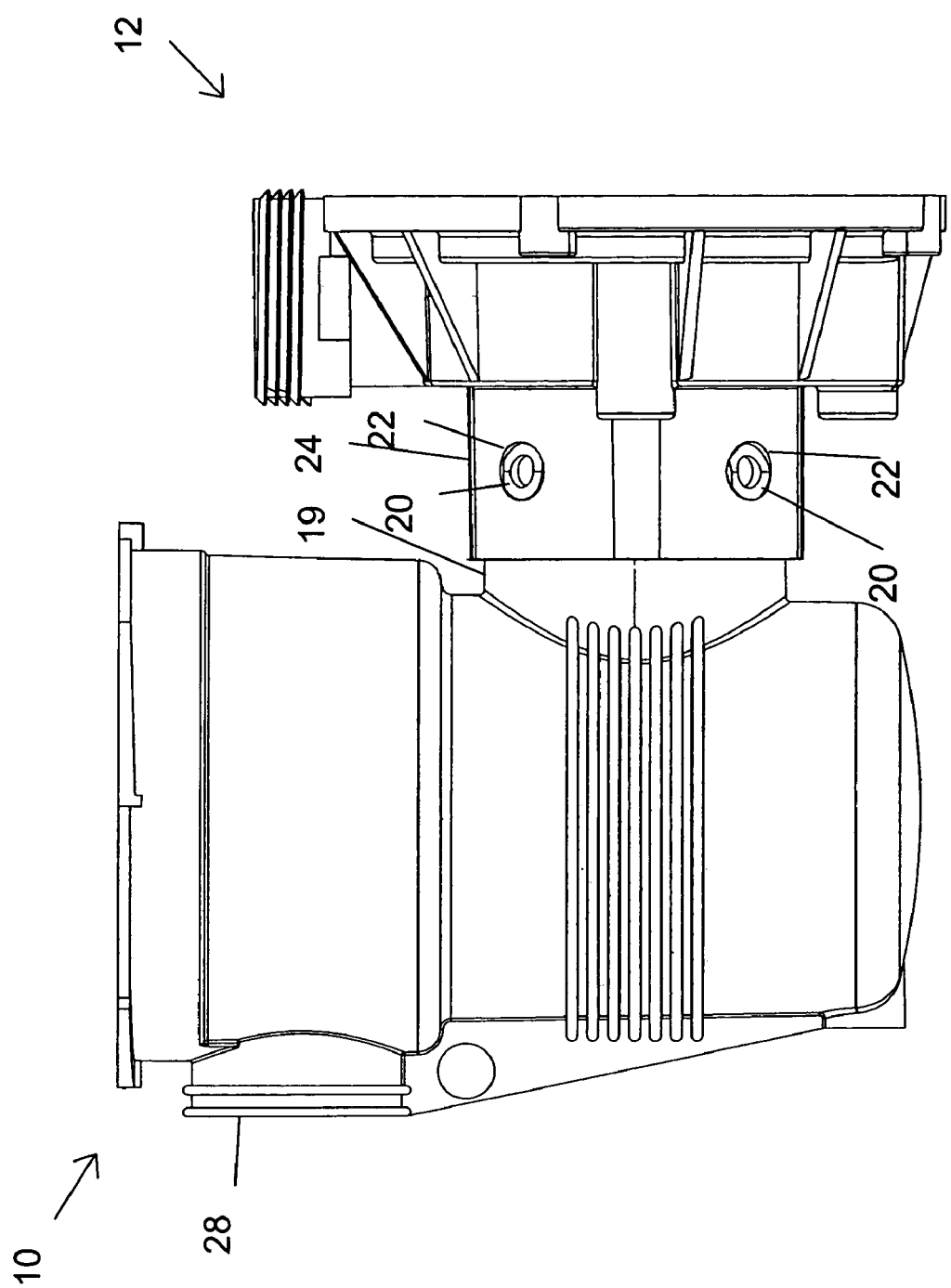
FIG. 3 is a front elevation of a strainer pot and pump assembly having a snap-fit connection according to an example embodiment of the present invention.
Figure 5:
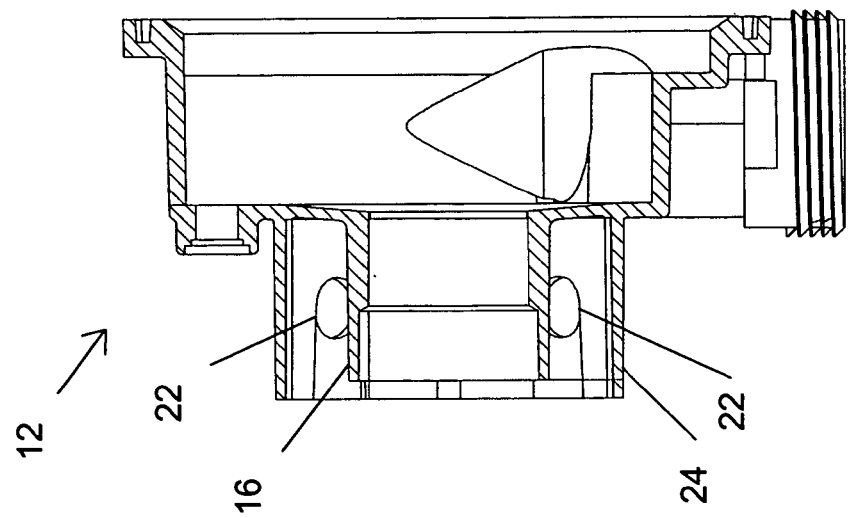
FIG. 5 is a sectional view of the pump of FIG. 2.
Figure 4:
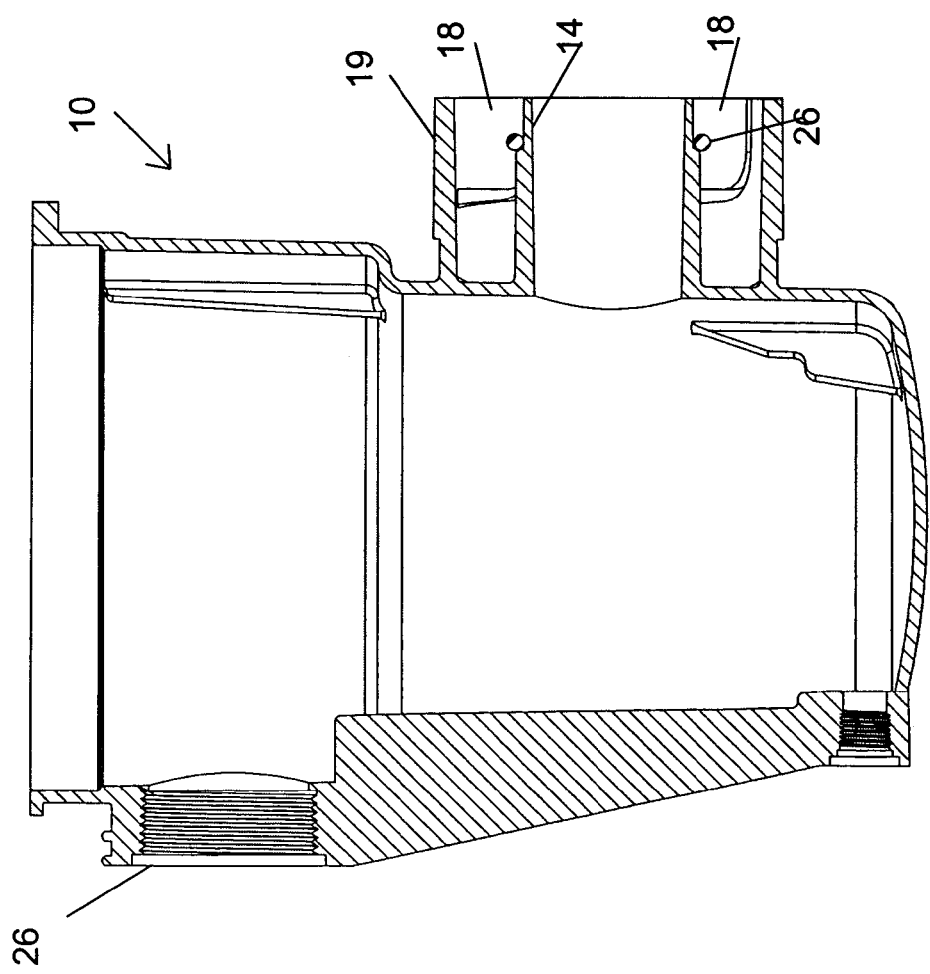
FIG. 4 is a sectional view of the strainer pot of FIG. 1.

As best shown in FIGS. 1 and 4, four circumferentially extending fingers or retaining clips 18 are provided at the end of a outlet connection tube or receptacle 19 that is coaxial to and surrounds the outlet tube 14 of the pot 10. Each of the fingers 18 includes a raised protrusion or button 20 that corresponds to a mating opening or hole 22 on an inlet connection tube or receptacle 24 that is coaxial to and surrounds the inlet tube 16 of the pump 12 (FIGS. 2 and 5).

The buttons 20 are tapered outwardly from their leading edge so that they increasingly deflect the corresponding finger 18 inwardly as the outlet connection tube 19 is inserted into the inlet connection tube 24. When the buttons 20 reach their corresponding mating holes 22, the fingers 18 spring outwardly causing the buttons 20 to engage their respective holes 22. Since the trailing edges of the buttons 20 are not tapered, each button 20 can be manually depressed while the connection tubes 19, 24 are pulled apart in order to disconnect the pot 10 from the pump 12. For applications where it is not desirable for the connection to be disconnectable, blind mating holes can be provided, preventing the buttons from being manually depressed.

Once the outlet connection tube 19 is filly inserted into the inlet connection tube 24, the outlet tube is seated inside of the inlet tube 16. An O-ring 26 is provided on the outlet tube 14 in order to form a watertight seal with the inlet tube 16. It should be evident that other means of sealing could be used, such as an adhesive sealant or an integral sealing flange.

Since the four fingers 18 and mating holes 22 are symmetrically provided around their respective conning tubes 19, 24, the strainer pot 10 may be rotated for alignment of the discharge port 28 at 0, 90, 180 or 270 degrees. Alternatively, different numbers of fingers and corresponding mating holes can be used, for example one, two, three, five, etc. in to allow alignment at different angles. For example, providing three symmetrically distributed fingers and mating holes would allow for rotation to 0, 120 and 240 degrees. Similarly, providing five symmetrically spaced fingers and corresponding mating holes would allow for rotation to 0, 72, 144, 216 and 288 degrees.

Further the fingers and corresponding mating hole can be asymmetrically spaced to prevent relative rotation or misalignment of the connected parts. Further, a reserve construction is possible, such as where the fingers are provided at the pump outlet and the mating hole are provided at the strainer pot. Although the connection tubes 19, 24 and the inlet and outlet tubes 14,16 of the present embodiment are generally cylindrical in shape, other shapes of tubes can be used in the present invention, such as tube having elliptical, square or polygonal profiles, and the like.

Further, the use of the snap-fit connection of the present invention is not limited to use for constructing a stainer pot to a pump housing. The snap-fit connection can be adapted for making any appropriate fluid connection between two vessels.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A snap-fit connection assembly for use in a pool filtration system, the connection comprising:
   a first connection receptacle;
   a second connection receptacle for insertion into the first connection receptacle, the second connection receptacle comprising a first open end, a second open end and a longitudinal axis extending between the first end and the second end;
   a finger comprising a free end, an attached end and a longitudinal axis extending between the free end and the attached end, the longitudinal axis of the finger being transverse to the longitudinal axis of the second connection receptacle, the attached end of the finger being attached at the second open end of the second connection receptacle;
   an opening in the first connection receptacle for engaging the free end of the finger; and
   at least one of a pump housing and a strainer pot, wherein the opening is provided at a distal end of the first connection receptacle, and wherein a proximal end of the first connection receptacle extends from said one of the pump housing and the strainer pot.

2. The snap-fit connection assembly of claim 1, further comprising:
   a second finger comprising a free end, an attached end and a longitudinal axis extending between the free end and the attached end, the longitudinal axis of the second finger being transverse to the longitudinal axis of the second connection receptacle; and
   a second opening in the first connection receptacle for engaging the free end of the second finger.

3. The snap-fit connection assembly of claim 2, further comprising:
   a third finger comprising a free end, an attached end and a longitudinal axis extending between the free end and the attached end, the longitudinal axis of the third finger being transverse to the longitudinal axis of the second connection receptacle;
   a third opening in the first connection receptacle for engaging the free end of the third finger;
   a fourth finger comprising a free end, an attached end and a longitudinal axis extending between the free end and the attached end, the longitudinal axis of the fourth finger being transverse to the longitudinal axis of the second connection receptacle; and
   a fourth opening in the first connection receptacle for engaging the free end of the fourth finger.

4. The snap-fit connection assembly of claim 3, wherein the opening, the second opening, the third opening and the fourth opening are symmetrically spaced about the first connection receptacle.

5. The snap-fit connection assembly of claim 1, wherein the free end of the finger comprises a protrusion for engaging the opening.

6. The snap-fit connection assembly of claim 5, wherein the protrusion comprises a tapered surface.

7. The snap-fit connection assembly of claim 1, further comprising:
   a first sealing duct positioned within the first connection receptacle; and
   a second sealing duct positioned within the second connection receptacle for sealing engagement with the first sealing duct.

8. The snap-fit connection assembly of claim 7, wherein the first sealing duct is coaxial to the first connection receptacle.

9. The snap-fit connection assembly of claim 7, wherein the second sealing duct is coaxial to the second connection receptacle.

10. The snap-fit connection assembly of claim 7, further comprising an O-ring for sealing the engagement of the first sealing duct and the second sealing duct.

11. A snap-fit connection assembly for use in a pool filtration system, the connection comprising:
    a first connection receptacle;
    a second connection receptacle for insertion into the first connection receptacle, the second connection receptacle comprising a first open end, a second open end and a longitudinal axis extending between the first end and the second end;
    a finger comprising a free end, an attached end and a longitudinal axis extending between the free end and the attached end, the longitudinal axis of the finger being transverse to the longitudinal axis of the second connection receptacle, the attached end of the finger being attached at the second open end of the second connection receptacle;
    an opening in the first connection receptacle for engaging the free end of the finger; and
    at least one of a pump housing and a strainer pot, wherein the first open end of the second connection receptacle is attached to said one of the pump housing and the strainer pot.

12. The snap-fit connection assembly of claim 11, further comprising:
    a second finger comprising a free end, an attached end and a longitudinal axis extending between the free end and the attached end, the longitudinal axis of the second finger being transverse to the longitudinal axis of the second connection receptacle; and
    a second opening in the first connection receptacle for engaging the free end of the second finger.

13. The snap-fit connection assembly of claim 12, further comprising:
    a third finger comprising a free end, an attached end and a longitudinal axis extending between the free end and the attached end, the longitudinal axis of the third finger being transverse to the longitudinal axis of the second connection receptacle;
    a third opening in the first connection receptacle for engaging the free end of the third finger;
    a fourth finger comprising a free end, an attached end and a longitudinal axis extending between the free end and the attached end, the longitudinal axis of the fourth finger being transverse to the longitudinal axis of the second connection receptacle; and
    a fourth opening in the first connection receptacle for engaging the free end of the fourth finger.

14. The snap-fit connection assembly of claim 13, wherein the opening, the second opening, the third opening and the fourth opening are symmetrically spaced about the first connection receptacle.

15. The snap-fit connection assembly of claim 11, wherein the free end of the finger comprises a protrusion for engaging the opening.

16. The snap-fit connection assembly of claim 15, wherein the protrusion comprises a tapered surface.

17. The snap-fit connection assembly of claim 11, further comprising:
   a first sealing duct positioned within the first connection receptacle; and
   a second sealing duct positioned within the second connection receptacle for sealing engagement with the first sealing duct.

18. The snap-fit connection assembly of claim 17, wherein the first sealing duct is coaxial to the first connection receptacle.

19. The snap-fit connection assembly of claim 17, wherein the second sealing duct is coaxial to the second connection receptacle.

20. The snap-fit connection assembly of claim 17, further comprising an O-ring for sealing the engagement of the first sealing duct and the second sealing duct.

* * * * *